(12) United States Patent
Zider

(10) Patent No.: US 10,585,298 B2
(45) Date of Patent: Mar. 10, 2020

(54) HINGED CONNECTIONS

(71) Applicant: Robert B. Zider, Portola Valley, CA (US)

(72) Inventor: Robert B. Zider, Portola Valley, CA (US)

( * ) Notice: Subject to any disclaimer, the term of this patent is extended or adjusted under 35 U.S.C. 154(b) by 0 days.

(21) Appl. No.: 15/548,086

(22) PCT Filed: Feb. 2, 2016

(86) PCT No.: PCT/US2016/016230
§ 371 (c)(1),
(2) Date: Aug. 1, 2017

(87) PCT Pub. No.: WO2016/126743
PCT Pub. Date: Aug. 11, 2016

(65) Prior Publication Data
US 2018/0011340 A1   Jan. 11, 2018

Related U.S. Application Data

(60) Provisional application No. 62/111,490, filed on Feb. 3, 2015, provisional application No. 62/111,503, filed on Feb. 3, 2015.

(51) Int. Cl.
*G02C 5/22* (2006.01)
*F16B 19/00* (2006.01)

(52) U.S. Cl.
CPC .......... *G02C 5/2209* (2013.01); *F16B 19/004* (2013.01)

(58) Field of Classification Search
CPC .......... G02C 5/22; G02C 5/2281; G02C 9/02; G02C 5/2272

(Continued)

(56) References Cited

U.S. PATENT DOCUMENTS

| 3,941,461 A | 3/1976 | Lambert |
| 4,076,394 A | 2/1978 | Nakamura |

(Continued)

FOREIGN PATENT DOCUMENTS

| WO | PCT/US 2016/016230 | 3/2016 |
| WO | PCT/US2016/016230 | 3/2016 |
| WO | PCT/US2016/016230 | 8/2017 |

*Primary Examiner* — Hung X Dang
(74) *Attorney, Agent, or Firm* — T.H.P. Richardson

(57) ABSTRACT

A hinged connection between first and second members (24, 25) which makes use of a fixation pin (1). The fixation pin (1) has a first configuration which enables the pin to be inserted through a first hole in a first member (24), through an aligned intermediate hole in the second member (25) and through an aligned second hole in the first member (24). The fixation pin (1) does not have a screw thread on its exterior surface. The fixation pin (1) after it has been inserted is subject to a treatment which changes it to a second configuration, or the fixation pin spontaneously changes, while it is being inserted through the holes or immediately thereafter, to a second configuration. In the second configuration, part or all of the fixation pin contacts the wall of at least one of the holes, so that the first and second members are connected together at a hinged connection. The invention is particularly useful when the hinged connection is part of an eyeglass assembly, wherein the temple member or the frame member is the first member (24) and the other is the second member (25).

9 Claims, 8 Drawing Sheets

(58) Field of Classification Search
USPC .................................. 351/153, 116; 16/228
See application file for complete search history.

(56) References Cited

U.S. PATENT DOCUMENTS

| | | | |
|---|---|---|---|
| 4,428,094 A | | 1/1984 | Emain |
| 4,869,585 A | | 9/1989 | Romanet |
| 5,195,859 A | * | 3/1993 | Thornton, Jr. .......... F16B 21/08 |
| | | | 16/228 |
| 5,584,631 A | | 12/1996 | Krumme |
| 6,164,775 A | | 12/2000 | Zider |
| 8,322,849 B2 | | 12/2012 | Krumme |
| 8,465,150 B2 | | 6/2013 | Zider |
| 8,662,541 B2 | | 1/2014 | Zider |
| 8,875,346 B2 | * | 11/2014 | Thompson ........... G02C 5/2209 |
| | | | 16/228 |
| 8,985,762 B2 | | 3/2015 | Zider |

* cited by examiner

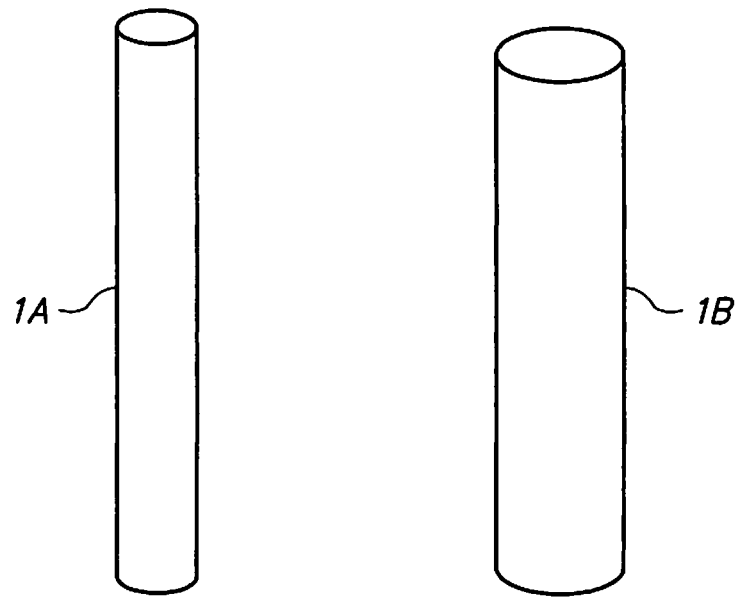
FIG. 1A  FIG. 1B
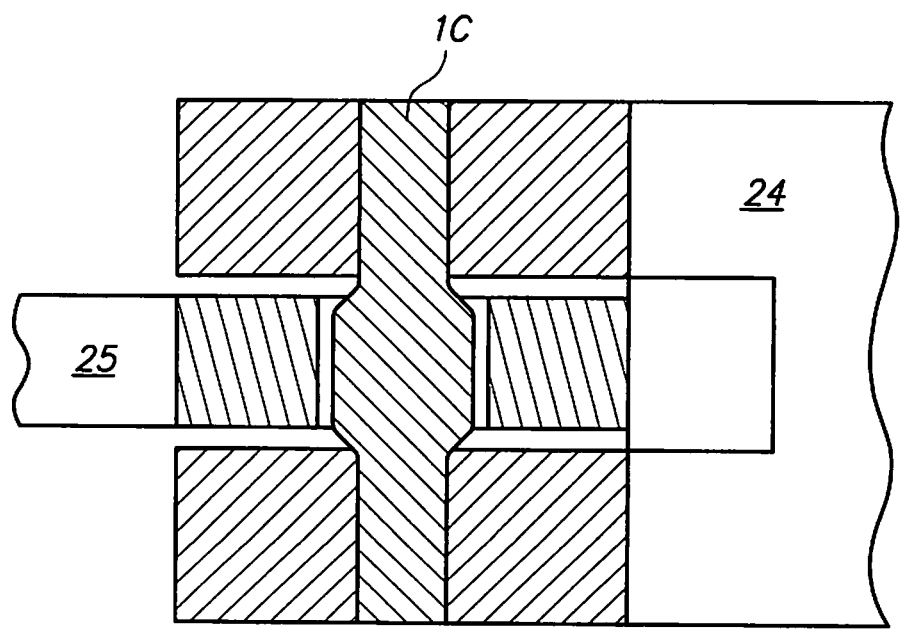
FIG. 1C

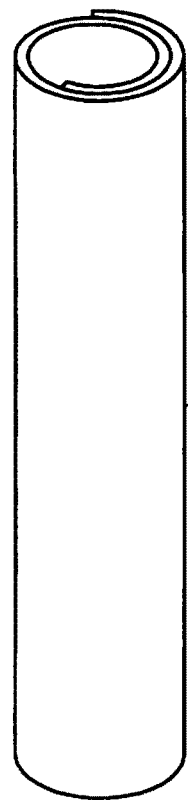
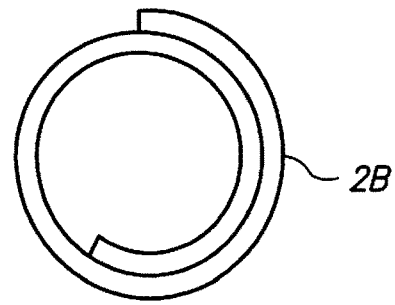
FIG. 2B
FIG. 2A
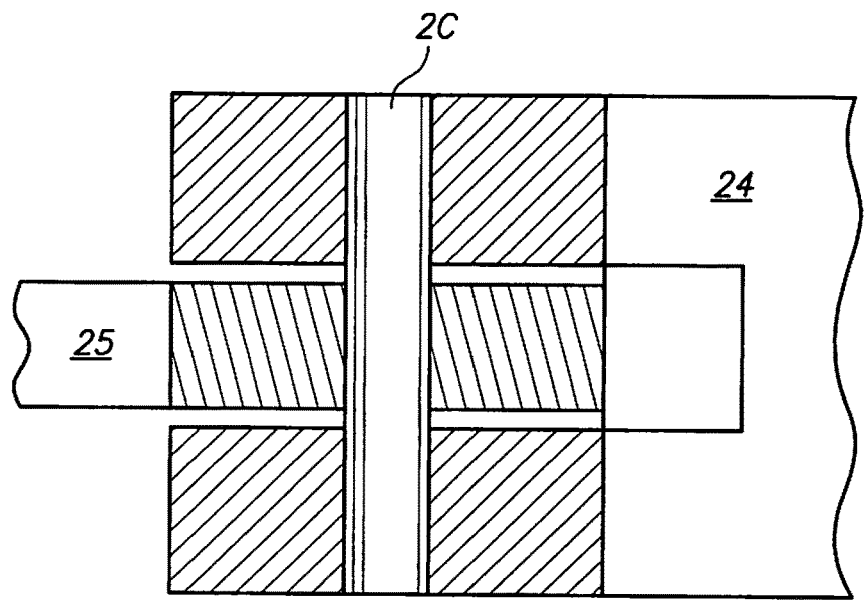
FIG. 2C

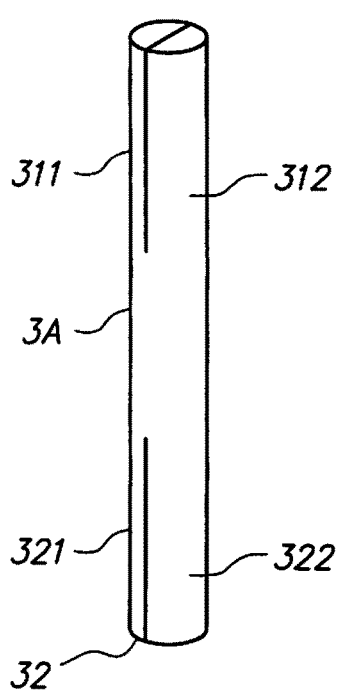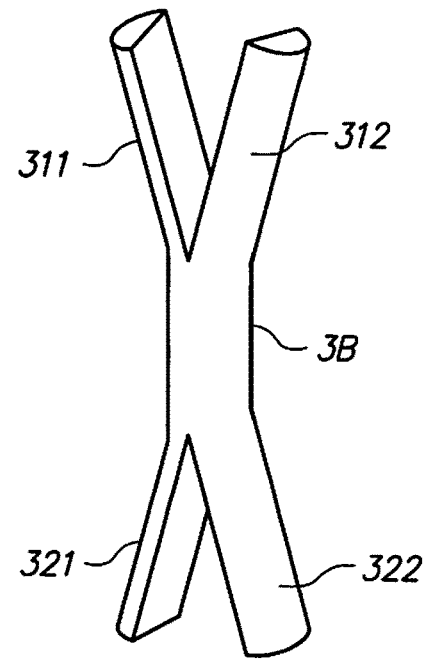
FIG. 3A          FIG. 3B
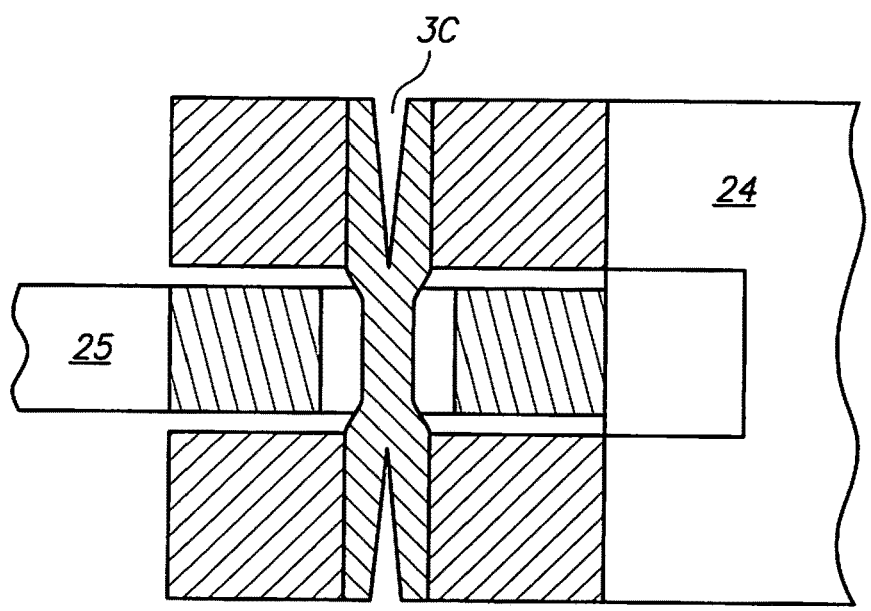
FIG. 3C

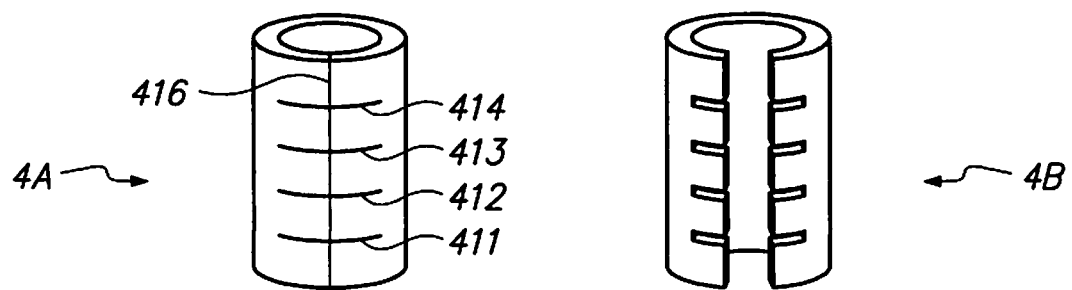
FIG. 4A  FIG. 4B
FIG. 5A  FIG. 5B

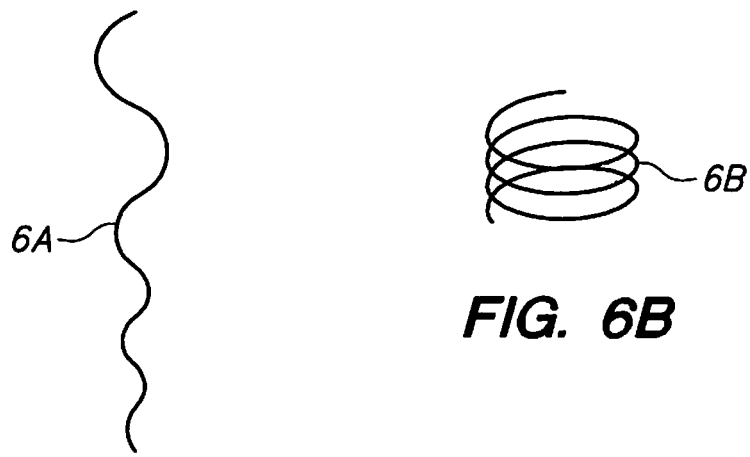
FIG. 6A
FIG. 6B
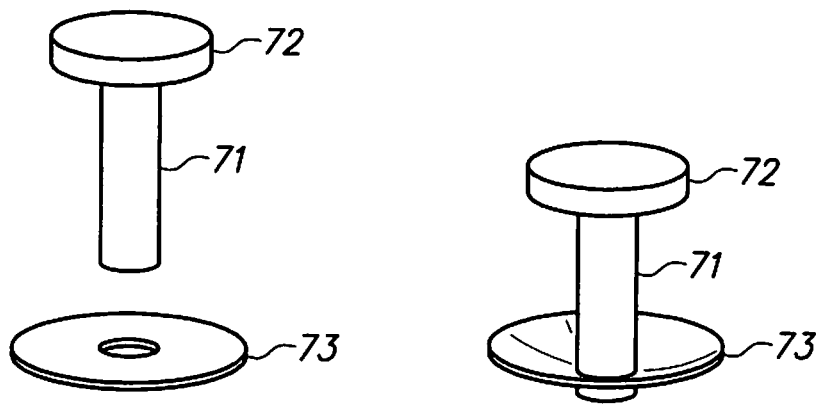
FIG. 7A
FIG. 7B

HINGED CONNECTIONS

CROSS-REFERENCE TO RELATED APPLICATIONS

This application claims priority from and the benefit of U.S. provisional applications 62/111,490 and 62/111,503, both filed 3 Feb. 2015.

FIELD OF THE INVENTION

This invention relates to hinged connections, for example hinged connections in eyeglasses.

BACKGROUND OF THE INVENTION

Eyeglasses often comprise two temple members, two lenses, and one or more frame members to which the lenses are attached. Each temple member is secured to a frame member at a hinged connection, in order that the temple members can be folded so as to be generally parallel to the plane of the lenses. In eyeglasses which have been relatively recently developed by Avantek, (i) each lens has a pair of engaging portions which extend from the periphery of the lens, (ii) a bridge member is attached to first engaging portions on each of the lenses, (iii) two frame members respectively attached to second engaging portions of each lens, and (iv) two temple members respectively attached at a hinged connection to a frame member. In other eyeglasses recently developed by Avantek, the frame member is a continuous bar (a "brow bar") which extends between the temple members, each lens has a single engaging portion which extends from the upper periphery of the lens and is attached to the brow bar, and each end of the brow bar is attached at a hinged connection to a temple member. For further information about these and similar eyeglasses, reference may be made to U.S. Pat. Nos. 6,164,775, 8,322,849, 8,465,150, 8,622,541 and 8,985,762, and U.S. Application No. 61/830,643. The entire disclosure of each of those patents and applications is incorporated herein by reference for all purposes.

In most eyeglasses, the hinged connection between the temple member and the frame member is secured by a screw. Generally, the screw (i) first passes through a first hole in the temple member or a first hole in the frame member, (ii) then passes through an intermediate hole which (a) is in the frame member if the first hole is in the temple member and (b) is in the temple member if the first hole is in the frame member, and (iii) finally is screwed into a thread within a second hole which is in the same member as the first hole.

SUMMARY OF THE INVENTION

This invention makes use of a novel fixation pin. The term "fixation pin" is used herein to denote an article which has a first configuration which enables the pin to be inserted through a first hole in a first member and then through a second hole in a second member, the second hole being aligned with the first hole. The fixation pin does not have a screw thread on its exterior surface. The fixation pin, after it has been inserted or while it is being inserted, changes to a second configuration in which part or all of the fixation pin contacts the wall of one or both of the holes, so that the first and second members are connected together at a hinged connection.

In many cases, the hinged connection is between (i) a first member including first and second holes which are aligned and separated and (ii) a second member including an intermediate hole which lies between, and is aligned with, the first and second holes. The invention will be chiefly described with reference to such hinged connections, in which the fixation pin is not subject to forces transverse to its axis. However, the invention includes hinged connections in which the fixation pin is positioned between only two holes, in particular such hinged connections in which the fixation pin is not subject to forces transverse to its axis.

The First Aspect of the Invention.

The first aspect of the invention is a hinged connection which comprises
  (A) a first member including (a) a first hole which has a first wall and (b) a second hole which (i) is aligned with and separated from the first hole and (ii) has a second wall,
  (B) a second member including an intermediate hole which (i) is positioned between and aligned with the first and second holes and (ii) has an intermediate wall, and
  (C) a fixation pin which does not have a screw thread on its exterior surface and which comprises (i) a first portion within the first hole, (ii) an intermediate portion within the intermediate hole, and (iii) a second portion within the second hole,
wherein at least a part of the fixation pin contacts
  (i) the first wall and the second wall, and optionally the intermediate wall, or
  (ii) the intermediate wall and optionally the first wall and the second wall.

When the hinged connection is part of an eyeglass assembly, the first member is the temple member and the second member is the frame member, or alternatively the first member is the frame member and the second member is the temple member.

In a variation of the hinged connection of the first aspect of the invention, the fixation pin (i) passes through the first, intermediate and second holes without necessarily contacting the first, intermediate and second walls, and (ii) includes a lower portion which extends beyond the second hole, and the hinged connection includes
  (D) a Belleville washer which is secured to the extending lower portion of the fixation pin.

The Second Aspect of the Invention.

The second aspect of the invention is a method of making a hinged connection, the method comprising the steps of
  (1) providing
    (A) a first member including (a) a first hole which has a first wall and (b) a second hole which (i) is aligned with and separated from the first hole and (ii) has a second wall, and
    (b) a second member including an intermediate hole which is positioned between and aligned with the first and second holes and which comprises an intermediate wall,
  (2) providing a fixation pin which (i) does not have a screw thread on its exterior surface, (ii) is in a first configuration and (iii) has a first end portion, an intermediate portion and a second end portion,
  (3) passing the first end portion of the fixation pin through the first hole,
  (4) after step (3), passing the first end portion of the fixation pin through the intermediate hole, while simultaneously passing the central portion of the fixation pin through the first hole, and
  (5) after step (4), passing the first end portion of the fixation pin into the second hole, while simultaneously passing the second end portion of the fixation pin into the first hole and passing the central portion of the fixation pin into the intermediate hole;
wherein
(A) the fixation pin, after it has been passed through the first, intermediate and second holes, is subject to a treatment which expands at least part of the fixation pin, or
(B) the fixation pin expands spontaneously while it is being passed through the first, intermediate and second holes or immediately thereafter,
so that at least a part of the fixation pin
(i) contacts the first wall and the second wall, and optionally contacts the intermediate wall, or
(ii) contacts the intermediate wall and optionally contacts the first wall and the second wall.

In a variation of the second aspect of the invention, a hinged connection is made by method comprising the steps of
(A) providing
   (a) a first member including (i) a first hole which comprises a first wall and (ii) a second hole which is aligned with and separated from the first hole and which comprises a second wall, and
   (b) a second member including an intermediate hole which is positioned between and aligned with the first and second holes and which comprises an intermediate wall,
(B) providing a fixation pin which has a first end portion, an intermediate portion and a second end portion,
(C) passing the first end portion of the fixation pin through the first hole,
(D) after step (C), passing the first end portion of the fixation pin through the intermediate hole, while simultaneously passing the central portion of the fixation pin through the first hole,
(E) after step (D), passing the first end portion of the fixation pin into the second hole and beyond the second hole to provide an extending lower portion, while simultaneously passing the second end portion of the fixation pin into the first hole and passing the central portion of the fixation pin into the intermediate hole, and
(F) after step (E) securing a Belleville washer to the extending lower portion of the fixation pin.

Third Aspect of the Invention.

The third aspect of the invention is a method of disassembling a hinged connection according to the first aspect of the invention or a hinged connection prepared by the method of the second aspect of the invention, the method comprising subjecting the hinged connection to conditions which change the second configuration of the fixation pin into a new configuration which reduces the strength of the connection between the fixation pin and one or more of the first, intermediate and second holes, for example a new configuration which enables the fixation pin to be removed with little or no force.

Fourth Aspect of the Invention.

The fourth aspect of the invention is a method of disassembling a hinged connection according to the second aspect of the invention which comprises subjecting an end of the fixation pin to a driving force which drives the fixation pin out of the hinged connection without making any change in the configuration of the fixation pin except changes which result from the driving force itself.

Fifth Aspect of the Invention.

The fifth aspect of the invention is an article which can be divided into a plurality of fixation pins suitable for use in the first and second aspects of the invention, for example an elongate article that can be divided by cross cutting into a plurality of fixation pins.

Sixth Aspect of the Invention.

The sixth aspect of the invention is a kit of parts which comprises a plurality of fixation pins suitable for use in first and second aspects of the invention, the fixation pins differing in one or more of the length, diameter and cross-section. The kit of parts can comprise, preferably in separate compartments of a container, two or more different fixation pins. Such a kit of parts can provide an optician with a range of options for the replacement of the screws which are in current conventional use.

Seventh Aspect of the Invention.

The seventh aspect of the invention is a frame member including a first hole having a first wall and a second hole having a second wall, the first and second holes being aligned and separated from each other and neither of the first wall and the second wall having a screw thread.

Eighth Aspect of the Invention.

The eighth aspect of the invention is a temple member including a first hole having a first wall and a second hole having a second wall, the first and second holes being aligned and separated from each other and neither of the first wall and the second wall having a screw thread.

Ninth Aspect of the Invention.

The ninth aspect of the invention is a kit of parts for a hinged connection which is part of an eyeglass assembly, the kit of parts comprising
(1) a first member including a first hole having a first wall and a second hole having a second wall, neither of the first and second walls having a screw thread, the first and second holes being aligned and separated from each other, and
(2) a second member including an intermediate hole which (i) has an intermediate wall which does not have a screw thread and (ii) is fitted, or can be fitted, between the first and second holes of the first member, one of the first member and the second member being a frame member and the other being a temple member.

The intermediate hole can be slightly larger than the first and second holes, or the first and second holes can be slightly larger than the intermediate hole, or the first, intermediate and second holes can be of the same size.

The kit of parts can optionally also contain a plurality of fixation pins suitable for use with the first and second members. If the fixation pins need to be kept at a low temperature in order to maintain the first configuration, the kit of parts should be maintained at such a temperature.

BRIEF DESCRIPTION OF THE DRAWINGS

The invention is illustrated in the accompanying drawings, which are diagrammatic, and not to scale, and in which FIG. 1A is a perspective view of a fixation pin which is a solid rod and which is in the first configuration. FIG. 1B is a perspective view of the fixation pin of FIG. 1A after it has expanded in the absence of restraint, FIGS. 1C, 1D and 1E are cross-sectional views of hinged connections in which the fixation pin of FIG. 1A is in the second configuration and secures together first and second holes in a first member and an intermediate hole in a second member. In FIG. 1C, the intermediate hole has a larger diameter than the first and second holes. In FIG. 1D, the first, second and intermediate holes have the same diameter. In FIG. 1E, the first and second holes have a larger diameter than the intermediate hole.

FIG. 2A is a perspective view of a fixation pin which is a rolled metal sheet and which is in the first configuration. FIG. 2B is a plan view of the fixation pin of FIG. 2A after it has expanded in the absence of restraint. FIG. 2C is a cross-sectional view of a hinged connection in which the fixation pin of FIG. 2A is in the second configuration and secures together first and second holes in a first member and an intermediate hole in a second member, all the holes having the same diameter.

FIG. 3A is a perspective view of a fixation pin which is a rod having a vertical slit in each end portion. FIG. 3B is a perspective view of the fixation pin of FIG. 3A after it has expanded in the absence of restraint. FIG. 3C is a cross-sectional view of a hinged connection in which the fixation pin of FIG. 3A is in the second configuration and secures together first and second holes in a first member and an intermediate hole in a second member, the intermediate hole having a larger diameter than the first and second holes.

FIG. 4A is a perspective view of a fixation pin which is in the first configuration and which a tube having a single vertical slit which runs from one end of the tube to the other and four partial horizontal slits which intersect the vertical slit. FIG. 4B is a perspective view of the fixation pin of FIG. 4A after it has expanded in the absence of restraint.

FIG. 5A is a perspective view of a fixation pin which is a tube having a plurality of intersecting slits at angles to each other and at an angle to the axis of the tube, and which is in the first configuration, and FIG. 5B is a perspective view of the fixation pin of FIG. 5A after it has expanded in the absence of restraint.

FIG. 6A is a perspective view of a fixation pin which is in the first configuration and which is a stretched spring or a wavy wire, and FIG. 6B is a perspective view of the fixation pin of FIG. 6A after it has expanded in the absence of restraint.

FIGS. 7A and 7B are perspective view of a fixation pin which is in two parts, namely (1) a pin which is inserted through the first, intermediate and second holes and which, after it has been inserted, protrudes beyond the second hole, and (2) a Belleville washer which is recovered around the protruding section of the pin.

DETAILED DESCRIPTION OF THE INVENTION

Figure 1D:
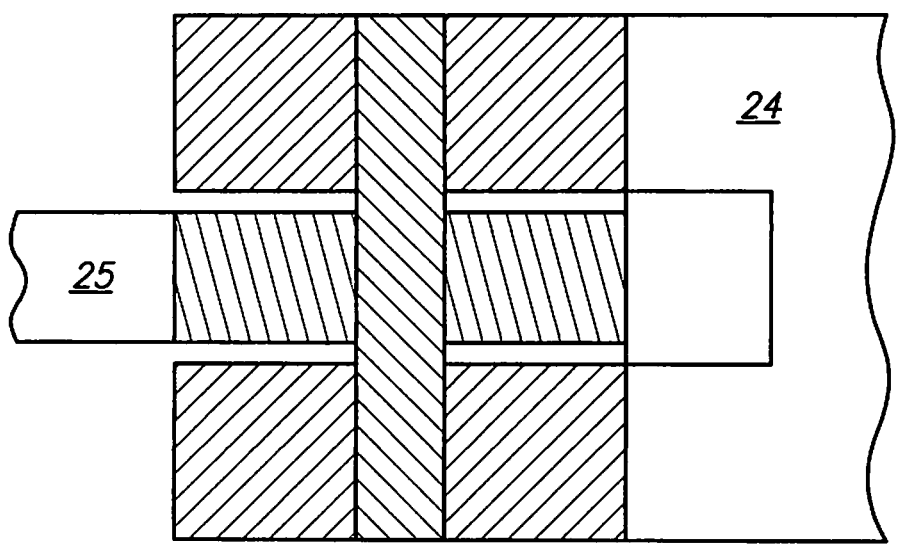

In the Summary of the Invention above, the Detailed Description of the Invention, the Examples, and the claims below, and the accompanying drawings, reference is made to particular features (including for example components, ingredients, elements, devices, apparatus, systems, groups, ranges, method steps, test results, etc.) of the invention. It is to be understood that the disclosure of the invention in this specification includes all possible combinations of such particular features. For example, where a particular feature is disclosed in the context of a particular aspect, a particular embodiment, a particular claim, or a particular Figure, that feature can also be used in combination with other particular aspects, embodiments, claims and Figures, and in the invention generally, except where the context excludes that possibility. The invention disclosed herein, and the claims, include embodiments not specifically described herein and can for example make use of features which are not specifically described herein, but which provide functions which are the same, equivalent or similar to, features specifically disclosed herein.

The term "comprises" and grammatical equivalents thereof are used herein to mean that, in addition to the features specifically identified, other features are optionally present. For example, a composition or device "comprising" (or "which comprises") components A, B and C can contain only components A, B and C, or can contain not only components A, B and C but also one or more other components. The term "consisting essentially of" and grammatical equivalents thereof is used herein to mean that, in addition to the features specifically identified, other features may be present which do not materially alter the claimed invention. The term "at least" followed by a number is used herein to denote the start of a range beginning with that number (which may be a range having an upper limit or no upper limit, depending on the variable being defined). For example "at least 1" means 1 or more than 1, and "at least 80%" means 80% or more than 80%. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When a range is given as "(a first number) to (a second number)" or "(a first number)-(a second number)", this means a range whose lower limit is the first number and whose upper limit is the second number. For example, "from 8 to 20 carbon atoms" or "8-20 carbon atoms" means a range whose lower limit is 8 carbon atoms, and whose upper limit is 20 carbon atoms. The terms "plural", "multiple", "plurality" and "multiplicity" are used herein to denote two or more than two features.

Where reference is made herein to a method comprising two or more defined steps, the defined steps can be carried out in any order or simultaneously (except where the context excludes that possibility), and the method can optionally include one or more other steps which are carried out before any of the defined steps, between two of the defined steps, or after all the defined steps, except where the context excludes that possibility. Where reference is made herein to "first" and "second" features, this is generally done for identification purposes; unless the context requires otherwise, the first and second features can be the same or different, and reference to a first feature does not mean that a second feature is necessarily present (though it may be present). Where reference is made herein to "a" or "an" feature, this includes the possibility that there are two or more such features (except where the context excludes that possibility). Thus there may be a single such feature or a plurality of such features. Where reference is made herein to two or more features, this includes the possibility that the two or more features are replaced by a lesser number or greater number of features which provide the same function, except where the context excludes that possibility. The numbers given herein should be construed with the latitude appropriate to their context and expression; for example, each number is subject to variation which depends on the accuracy with which it can be measured by methods conventionally used by those skilled in the art.

If any element in a claim of this specification is considered to be, under the provisions of 35 USC 112, an element in a claim for combination which is expressed as a means or step for performing a specified function without the recital in the claim of structure, material, or acts in support thereof, and is, therefore, construed to cover the corresponding structure, material, or acts described in the specification and equivalents thereof, then the corresponding structure, material, or acts in question include such structure, material, or acts described in the US patent documents incorporated by reference herein and the equivalents of such structure, material, or acts.

This specification incorporates by reference all documents referred to herein and all documents filed concurrently with this specification or filed previously in connection with this application, including but not limited to such documents which are open to public inspection with this specification.

In describing and claiming the invention below, the following abbreviations, definitions, and methods of measurement (in addition to any already given) are used.

The first, intermediate and second holes often have a circular cross-section, but one or more of them can have a non-circular cross-section. Where reference is made in this specification to the diameter of a hole, it should be understood that, if the hole is not circular, the diameter of the non-circular hole is the diameter of a circle which has the same area as the hole having a non-circular cross-section.

The terms "tube" is used in this specification to mean
(i) an article which is generally tubular and which, over part or all of its length, has a closed cross-section with a void within the cross-section (for example an annular cross-section) and
(ii) an article which is generally tubular and which, over part or all of its length, has an incomplete cross-section with a void within the cross-section (including, but not limited to, a cross-section which is part of an annular shape, for example a generally C-shaped cross-section).

Reference is made herein to heat-recoverable nickel titanium alloy fixation pins, to superelastic nickel titanium alloy fixation pins and to heat-recoverable cross-linked polymeric fixation pins. The technology of such nickel titanium alloys and heat-recoverable polymeric materials is well-established, and those of ordinary skill in the art will have no difficulty, having regard to their own knowledge and the disclosure in this specification in making and using fixation pins comprising such alloys and/or polymeric materials in the present invention.

The Fixation Pin.

Alternative versions of the fixation pin are set out below.
(1) Fixation Pins Which are in the Form of a Rod and Which are Changed into the Second Configuration after Insertion through the Holes.

The fixation pin can be a rod which (i) is stable in the first configuration, (ii) is inserted through the first, intermediate and second holes while it is in the first configuration, and (iii) after it has been inserted, is subject to a treatment which changes the rod into the second configuration and causes at least part of the rod to press the walls of one or more of the first, intermediate and second holes. The treatment can be, for example, (i) a change in the temperature of the rod (which can result from positive heating of the hinged connection or simply allowing a rod which is stable in the first configuration at below ambient temperature to warm to ambient temperature), or (ii) exposure of the rod to ultraviolet, infrared or microwave radiation.

The rod is often generally cylindrical, but can have an outer surface which is another smooth curve, e.g. an ellipse, or which is polygonal.

The cross-section of the second configuration can be simply an expanded version of the cross-section of part or all of the first configuration, i.e. an increase in the effective diameter of the fixation pin. Alternatively or additionally, the cross-section of the second configuration can be a change in the nature of the cross-section, for example a change from a circular cross-section to an oval cross-section (or vice versa).

The rod, in its first configuration, can have, in the absence of any restraint, the same response throughout its length to the treatment to which it is later subject while it is in the first, intermediate and second holes. Alternatively, different sections along the length of the rod can have in the absence of any restraint, different responses to the treatment.

In one embodiment (Embodiment 1A), the rod is a straight rod. The cross-section of the rod can be the same throughout its length or there can be two or more different longitudinal portions along the length of the rod. In one example of this embodiment, the rod is a straight rod which has a solid central portion and two end portions in each of which there is at least one vertical slit, and the treatment to which the rod is subjected while it is in the first, intermediate and second holes causes the end portions of the rod to splay out and contact the walls of the first and second holes.

In another embodiment (Embodiment 1B) the rod is in the form of a plurality of interlinked curves, as may, for example, be formed by distorting a straight rod. The interlinked curves are such that the curved rod can be inserted through the first, intermediate and second holes, optionally with some elastic changes in the rod as it is inserted. After the rod has been inserted, it is subject to the treatment which converts the rod into the second configuration in which the interlinked curves are at least partially flattened.

In one example of Embodiments 1A and 1B, the rod is composed of a nickel titanium alloy and is stable when the rod is in its first configuration but is converted to the second configuration by the treatment to which the rod is subject after it has been inserted. The rod can, for example, have the first configuration when it is at a relatively low temperature, for example less than 5° C. or less than 10° C., and is, therefore, maintained at such a low temperature before it is inserted into the first, intermediate and second holes. After the rod has been inserted, it is heated to a temperature at which it changes to the second configuration. When such a rod is used, cooling the hinged connection to a low temperature may make it possible to reduce or remove the pressure between the rod and the walls of the first, intermediate and second holes, so that the rod can be easily removed.

In other examples of Embodiments 1A and 1B, the rod is composed of a cross-linked polymer and is stable when the rod is in its first configuration and is at a relatively temperature, for example ambient temperature, but is changed to the second configuration by heating the rod after it has been inserted. The rod can be changed to the second configuration by heating it to an elevated temperature.

(2) Fixation Pins Which are in the Form of a Tube and Which are Changed into the Second Configuration after Insertion through the Holes.

The fixation pin can be a tube which (i) is stable in the first configuration, (ii) is inserted through the first, intermediate and second holes while it is in the first configuration, and (iii) after it has been inserted, is subject to a treatment which changes the tube into the second configuration and causes at least part of the tube to contact the walls of one or more of the first, intermediate and second holes. The treatment can be, for example, (i) a change in the temperature of the tube (which can result from positive heating of the hinged connection or simply allowing a tube which is stable in the first configuration at below ambient temperature to warm to ambient temperature), or (ii) exposure of the tube to ultraviolet, infrared or microwave radiation.

The tube can be generally cylindrical with an annular cross section, but can have an outer surface and/or an inner surface which is another smooth curve, e.g. an ellipse, or which is polygonal.

The cross-section of the second configuration can simply be an expanded version of the cross-section of part or all of the first configuration. Alternatively or additionally, the cross-section of the second configuration can be a change in the nature of the cross-section, for example a change from a circular cross-section to an oval cross-section (or vice versa).

The tube, in its first configuration, can have, in the absence of any restraint, the same response throughout its length to the treatment to which it is later subject while it is in the first, intermediate and second holes. Alternatively, different sections along the length of the tube can have in the absence of any restraint, different responses to the treatment. The cross-section of the tube can be the same throughout its length or there can be two or more different longitudinal portions along the length of the tube.

In a first embodiment (Embodiment 2A), the tube has a central portion of constant cross-section and two end portions in each of which there are at least two vertical slits, and the treatment to which the tube is subjected while it is in the first, intermediate and second holes causes the end portions of the tube to splay out and contact the walls of the first and second holes.

In a second embodiment (Embodiment 2B), the pin 1 has a constant C-shaped cross-section and is divided by two slits which are cut part way into the tube 1 at right angles to the axis of the tube, leaving a continuous vertical section 13 of tube 1 which is not penetrated by the slits. The slits divide the fixation pin into an upper portion, an intermediate portion and a lower portion. When the fixation pin is subjected to a suitable heat treatment in the absence of any restraint, each of the upper, intermediate and lower portions increases in size by the same amount. The axial heights of the upper, central and lower portions can be the same or different. The axial height of the central portion can be 0.8 to 1.6 times, e.g. 1.4-1.5 times, the axial height of each of the upper and lower portions. The C-shaped cross-section can for example extend around 270-320°, e.g. 290-310°, leaving a gap of 40-90°, e.g. 50-70°, between the ends of the C-shaped cross-section. The continuous vertical section of the tube which is not penetrated by slits can for example extend around 50-70°, e.g. about 60°, of the cross-section. This fixation pin, in its second configuration, opens out to increase its effective diameter in the hinged connection. The extent to which the different portions open out depends upon the diameters of the first, intermediate and second holes. For example, if the first and second holes have the same diameter and the intermediate hole has a larger diameter, the upper and lower portions of the pin are secured to the first and second holes, and the central portion is a rotatable fit within the intermediate hole. An advantage of this is that the central portion of the tube is trapped so that there is little danger of the tube being displaced accidentally. Furthermore, there can be little or no change in the resistance to rotation of the hinged connection as a result of extended use, because the central portion of the tube can automatically increase in diameter to compensate for wearing of the surface of the intermediate hole.

In a third embodiment (Embodiment 2C), the fixation pin is a tube having two sets of intersecting slits at angles to each other and at an angle to the axis of the tube. The slits result in a tube having characteristics similar to a stent.

In a fourth embodiment (Embodiment 2D), the fixation pin is a tube comprising two sets of overlapping and interconnected strands, the two sets being at angles to each other and at an angle to the axis of the tube. The tube has characteristics similar to a stent.

In a fifth embodiment (Embodiment 2E), the fixation pin is a tube which is composed of a sheet of material which is stable when the tube is in its first configuration, the sheet having been rolled up so that the tube comprises overlapping longitudinal portions. The overlap can be at least 25%, for example 25-100%, of the cross-section of the tube. After the tube has been inserted through the first, intermediate and second holes, it is subject to a treatment which causes the tube to expand by reducing the overlap.

In Embodiments 2A, 2B, 2C, 2D and 2C, the material of the tube can comprise a nickel titanium alloy or other material which is stable when the tube is in its first configuration but which is converted to the second configuration by the treatment to which the tube is subject after it has been inserted. The tube can, for example, have the first configuration when it is at a relatively low temperature, for example less than 5° C., and is, therefore, maintained at such a low temperature before it is inserted into the first, intermediate and second holes. After the tube has been inserted, it is heated to a temperature at which it is converted to the second configuration. When such a tube is used, cooling the hinged connection to a low temperature may make it possible to reduce or remove the pressure between the tube and the walls of the first, intermediate and second holes, so that the tube can be easily removed.

In Embodiments 2A and 2E, the tube can be a cross-linked polymeric material which is stable in the first configuration at the temperature at which the tube is inserted, but which, when heated after it has been inserted, expands so that the tube is converted to the second configuration.

(3) Fixation Pins which are in the Form of a Rolled-up Sheet.

The fixation pin, in the first configuration, can be a tube which is composed of a sheet of elastically deformable material, the sheet having been rolled up so that the tube comprises overlapping longitudinal portions and the elastically deformable material is elastically deformed. The overlap can be at least 25%, for example 25-100%, of the cross-section of the tube. The tube must be restrained so that it is in the first configuration before it inserted through the first, intermediate and second holes. The tube can be restrained inside a cylindrical restraint which is placed over the first hole before the tube is forced through the first, intermediate and second holes. The elastic recovery of the tube changes it into the second configuration.

The material of the rolled-up sheet can comprise a nickel titanium alloy, including a superelastic nickel titanium alloy. Alternatively, the rolled-up sheet can comprise a polymeric material, for example a cross-linked polymeric material.

(4) Fixation Pins which are in the Form of a Rod or a Tube and which are Changed into the Second Configuration while being inserted through the Holes.

The fixation pin can be a rod or a tube which has a diameter greater than the smallest of the first, intermediate and second holes and which can be changed into the second configuration simply by forcing it through the holes, making use of elastic or non-elastic deformation of the fixation pin and/or elastic or non-elastic deformation of one or more of the first, intermediate and second holes. The fixation pin is preferably composed of a superelastic nickel titanium alloy.

Optional Features of the Fixation Pins.

The lip of the fixation pin which first enters the first hole can be chamfered to assist in its placement into the first hole. The fixation pin can be symmetrical about a centerline. In that case, it is not important which end of the fixation pin enters the first hole, and both ends of the fixation pin can be chamfered. If the fixation pin is not symmetrical, it can comprise an enlarged head so that it is easy to know when the fixation pin has been fully inserted into the first, intermediate and second holes. If the fixation pin comprises an enlarged head, the enlarged head can comprise means for loosening or withdrawing the fixation pin from the hinged connection. If the fixation pin does not comprise an enlarged head, one or both of the ends of the fixation pin can comprise means for loosening or withdrawing the fixation pin from the hinged connection. Such means can be, for example a thread into which a screw can be screwed or a non-circular, e.g. polygonal, recess into which a tool can be inserted to rotate the fixation pin.

The dimensions of the fixation pin will vary with the intended use. For a fixation pin which is to serve the same function as a conventional screw in a hinged connection between a temple member and an eyeglass frame, the fixation pin may for example have a length of 0.3-2 cm, for example 1.0 -1.5 cm and a diameter of 0.1-0.25 cm, for example about 0.2-0.25 cm. For other uses, the fixation pin may for example have dimensions which are 2 or 3 times those of a conventional screw.

The First and Second Members.

The invention is of particular, but not exclusive, interest when the hinged connection is between the temple member and the frame member of an eyeglass assembly. The first member is the temple member and the second member is the frame member, or alternatively the first member is the frame member and the second member is the temple member.

The first and second holes in the first member can be identical circular holes of the same diameter. However, the holes are not necessarily circular and they are not necessarily identical. For example, the second hole can have an internal thread of the type which is needed when a screw is used in an eyeglass assembly, thus making it possible to use the invention without eliminating the screw thread which is present in the conventional temple member or in the conventional frame member. The walls of the first, intermediate and second holes can be the same, e.g. be smooth, or be different. For example, the internal surfaces of the first and second holes can be rougher than the internal surface of the intermediate hole (which can be smooth), so that the fixation pin is secured preferentially to the first and second holes. Alternatively, the wall of the intermediate hole can be rougher than the walls of the first and second holes (which can be smooth), so that the fixation pin is secured preferentially to the intermediate hole. The term "smooth" excludes the possibility that the wall of the hole has a screw thread, but includes the possibility that the hole has been otherwise machined or treated so that the contact between the wall and the fixation pin is enhanced.

The fixation pin can be either (i) more firmly secured to the walls of the first and second holes than to the intermediate hole, so that the second member can be more easily rotated relative to the first member, or (ii) more firmly secured to the intermediate hole than to the first and second holes, so that the first member can be more easily rotated relative to the second member, or (iii) equally secured to all the holes.

In some embodiments of the invention, the fixation pin is such that, if it is desired to disassemble the hinged connection, the second configuration can be changed into a new configuration which enables the fixation pin to be removed. The fixation pin may be restored to or towards the first configuration, or partially or completely disintegrated, by subjecting it to conditions which are not normally encountered in the use of the hinged connection, for example a lower temperature, a higher temperature, or exposure to a solvent or to electromagnetic radiation. If a lower temperature is used for this purpose, it can for example be a temperature less than 5° C., preferably less than 0° C., so that the fixation pin shrinks in diameter. If a higher temperature is used for this purpose, it should be higher than the temperature which the hinged connection is normally exposed to, for a temperature of at least 50° C., for example at least 65° C., e.g. 50-100° C.

The Drawings.

The drawings make use of the following reference numerals.

1A is a fixation pin which is in in the form of a rod and which is in the first configuration.

1B is the fixation pin 1A which has been expanded in the absence of any restraint.

1C is the fixation pin 1A when it forms part of a hinged connection.

2A is a fixation pin which is in the form of a rolled metal sheet and which is the first configuration.

2B is the fixation pin 2A which has been expanded in the absence of any restraint.

2C is the fixation pin 2A when it forms part of a hinged connection.

3A is a fixation pin which (a) is in the form of a rod having a vertical slit 31, 32 in its end portions, dividing the rod into end sections 311, 312 and 321, 322 respectively, and (b) which is the first configuration.

3B is the fixation pin 3A which has been expanded in the absence of any restraint.

3C is the fixation pin 3A when it forms part of a hinged connection.

4A is a fixation pin which (i) is a tube having a single vertical slit 416 and four partial horizontal slits 411, 412, 413 and 414, and (ii) is in the first configuration.

4B is fixation pin 4A which has been expanded in the absence of any restraint.

5A is a fixation pin which is a tube having a plurality of intersecting slits at angles to each other and at an angle to the axis of the tube, and which is in the first configuration.

5B is the fixation pin 5A after it has expanded in the absence of restraint.

6A is a fixation pin which is a stretched spring or a wavy wire, and which is in the first configuration.

6B is the fixation pin 6A after it has expanded in the absence of restraint.

7A is a fixation pin which (i) is in two parts, namely a pin having a stem 71 and a head 72 and a Belleville washer 73, and (ii) is in the first configuration.

7B is the fixation pin 7A with the Belleville washer 73 secured to the bottom of the stem 7,

8 is a fixation pin which is a tube which has a constant C-shaped cross section and which is divided by two slits 811 and 812 which are cut part way into the tube at right angles to its axis. A continuous vertical section 813 is not penetrated by the slits. The slits divide the fixation pin into an upper portion 821, an intermediate portion 822 and the lower portion 823.

24 is a first member including first and second holes which are aligned and separated.

25 is a second member including an intermediate hole which is aligned with the first and second holes.

FIGS. 1A-1E

FIG. 1A shows a fixation pin which is a solid rod of a material which, when subject to a suitable treatment, will increase in diameter and decrease in length, thus becoming, in the absence of any restraint, a rod as shown in FIG. 1B. The fixation pin can be used as part of a hinged connection between (i) a first member having first and second separate aligned holes and (ii) a second member having an intermediate hole, as shown in FIGS. 1C, 1D and E. The fixation pin is inserted through the first, intermediate and second holes, and is then subject to the treatment. If the diameter of the intermediate hole is greater than the diameter of the first and second holes, the rod will expand to make contact with the first and second holes and, depending upon the extent of the expansion and the diameter of the intermediate hole, the rod will or will not contact the intermediate hole.

The treatment needed to change the shape of the fixation pin depends upon the material of the rod. The fixation pin can be composed of a nickel titanium alloy such that the rod can be expanded from the first configuration to the second configuration by a suitable heat treatment. The first configuration can be one which is stable while the rod is at a relatively low temperature, for example less than 0° C., and the second configuration can be one which is stable at a higher temperature. In that case, the fixation pin can be at the lower temperature when it is inserted, and the treatment can be to heat the fixation pin to the higher temperature (including simply leaving the fixation pin to warm to ambient temperature). When using such a fixation pin, depending upon the nickel titanium alloy used, it may be possible to remove the fixation pin by cooling the hinged connection to the lower temperature, so that the fixation pin reverts to (or towards) the first configuration.

Alternatively the fixation pin can be composed of a cross-linked polymeric material and have a first configuration which is stable at relatively low temperatures, for example less than 50° C., but can be converted to the second configuration by heating to a higher temperature.

As shown in FIG. 1C, the first and second holes have a greater diameter than the intermediate hole and the fixation pin does not contact the intermediate hole, leaving the member 25 free to rotate around the fixation pin (subject to any frictional forces between the members 24 and 25). Alternatively, but not illustrated, the fixation pin can expand so that it contacts the intermediate hole, but with less force than its contact with the first and second holes. This can result in a hinged connection having a desired resistance to rotation of the second member 25 relative to the fixation pin. The greater diameter of the fixation pin in the intermediate hole prevents the fixation pin from being inadvertently removed from the hinged connection.

As shown in FIG. 1D, the first, intermediate and second holes have the same diameter, and the fixation pin contacts each of the holes with the same force. The contact should not, of course, be such that it is impossible to rotate the members 24 and 25 relative to each other. The depth of the holes, and, therefore, the area of contact between the fixation pin and the walls of the holes, can be different, and this will affect the force needed to rotate one or both of the members 24 and 25 relative to the fixation pin.

Figure 1E:
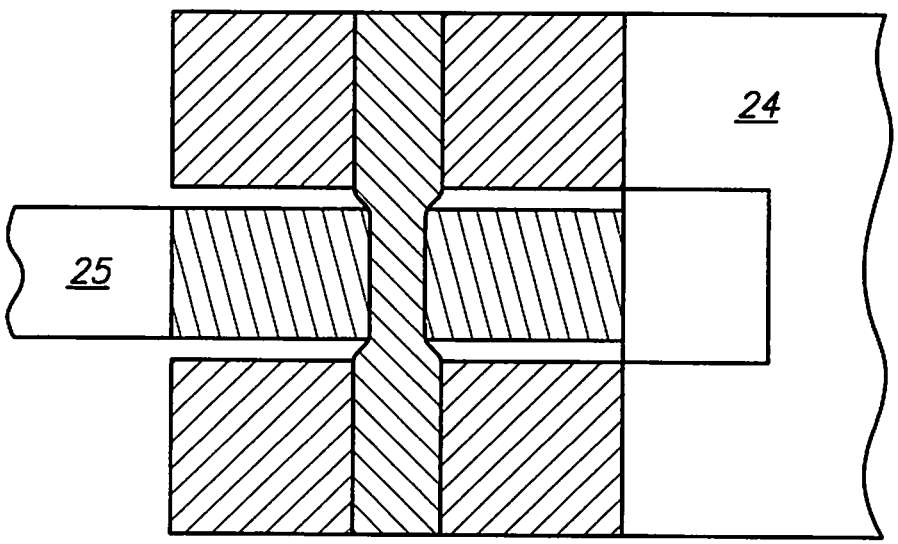

As shown in FIG. 1E, the first and second holes have a smaller diameter than the intermediate hole and the fixation pin contacts the walls of each of the holes. As in FIG. 1D, the contact should not be such that it is impossible to rotate the members 24 and 25 relative to each other. The smaller diameter of the fixation pin in the intermediate hole prevents the fixation pin from being inadvertently removed from the hinged connection.

FIGS. 2A-2C.

FIGS. 2A and 2B show a tubular fixation pin which is a rolled up sheet of a nickel titanium alloy which is stable in the first configuration, but which, when heated, will expand and increase the diameter of the fixation pin. FIG. 2C shows the fixation pin when it is part of a hinged connection.

FIGS. 3A-3C.

FIGS. 3A and 3B show a fixation pin which is a solid rod 1 made of a nickel titanium alloy and which has vertical slits in its end portions. The slits divide one of the end portions into sections 311 and 312 and the other end portion into sections 321 and 322. FIG. 3B shows the shape which the rod will assume when subjected to a suitable heat treatment in the absence of any restraint, with the sections 311, 312, 321 and 322 flaring outwards from the central section. FIG. 3C shows the fixation pin when it is part of a hinged connection, with the end portions 311, 312, 321 and 322 pressing the first and second holes of the first member.

FIGS. 4A-4B.

FIG. 4A shows a tubular fixation pin which is in the first configuration, which is made of a nickel titanium alloy and which is in the first configuration. The tube is divided by a single axial slit 416 and four horizontal slits 411, 412, 413 and 414 which intercept the slit 416. FIG. 4B shows the shape which the fixation pin will assume when subjected to a suitable heat treatment in the absence of any restraint, namely a slit tube of increased size.

FIGS. 5A-5B.

FIG. 5A shows a tubular fixation pin which is in the first configuration, which is made of a nickel titanium alloy, and which is a tube having a two sets of intersecting slits at angles to each other and at an angle to the axis of the tube. FIG. 5B shows the shape which the fixation pin will assume when subjected to a suitable heat treatment in the absence of any restraint, namely a slit tube of increased size.

FIGS. 6A-6B.

FIG. 6A shows a fixation pin which is in the first configuration, which is a rod which has been formed into a plurality of interlinked curves 6A, as may, for example, be formed by distorting a straight rod, and which is composed of a nickel titanium alloy. FIG. 6B shows the shape which the fixation pin will assume when subjected to a suitable heat treatment in the absence of any restraint, namely a coiled spring 6B. The interlinked curves are such that the curved rod can be inserted through the first, intermediate and second holes, optionally with some elastic changes in the rod as it is inserted. After the rod has been inserted, it is subject to a treatment which converts the rod into the second configuration.

FIGS. 7A-7B.

FIG. 7A shows a fixation pin which is in two parts, namely a pin which has a stem 71 and a head 72, and a Belleville washer 73 which can be mated with the end of the stem 71. FIG. 7B shows the assembled fixation pin. The first, intermediate and second holes through which the stem 71 has been inserted have been omitted from FIG. 7B in the interests of clarity.

FIGS. 8-11.

Figure 8:
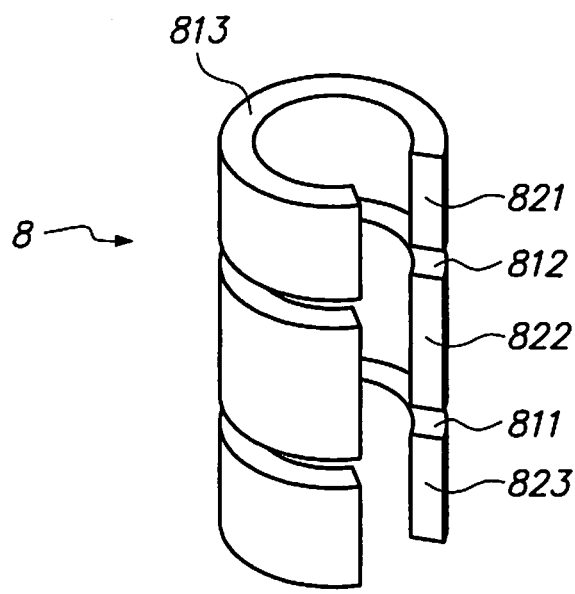
FIG. 8 is a perspective view of a fixation pin which is in the first configuration.
Figure 9:
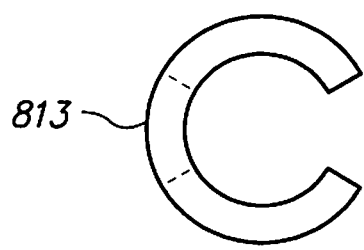
FIGS. 9 and 10 are respectively a top view and a side view of the tubular fixation pin of FIG. 8.
Figure 10:
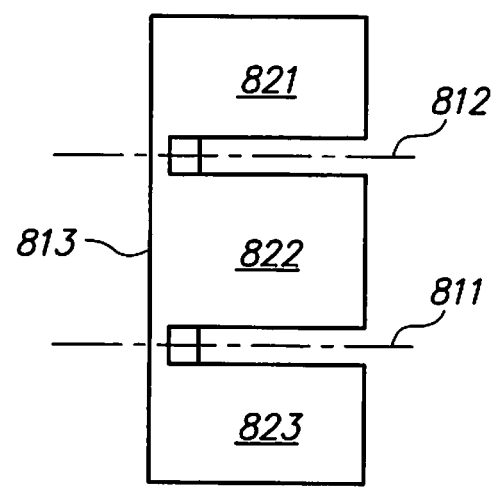
Figure 11:
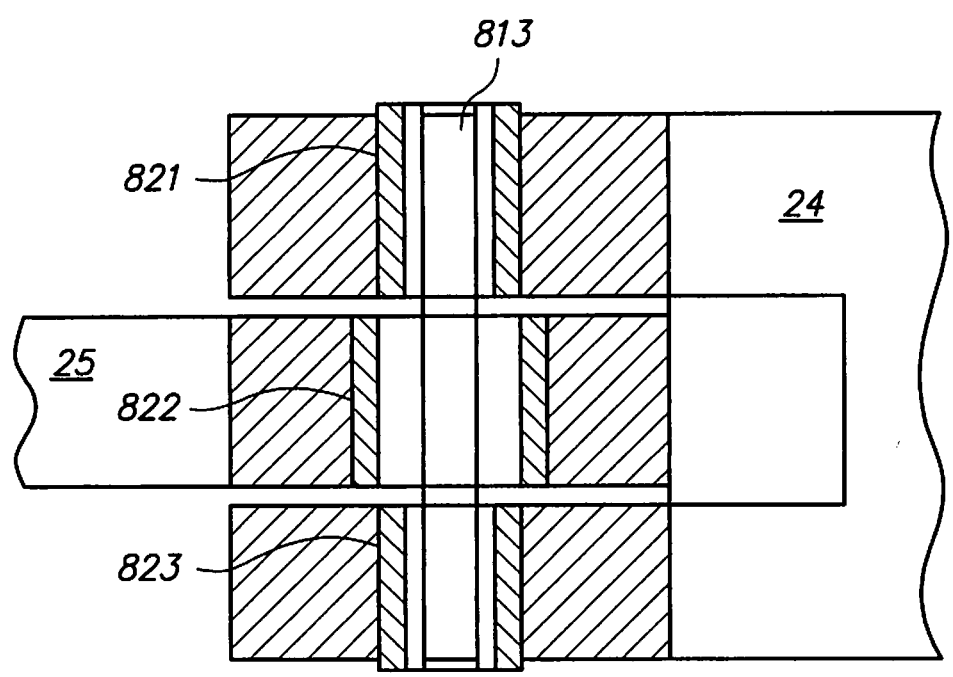
FIG. 11 is a cross-sectional view of a hinged connection in which fixation pin shown in FIGS. 8, 9 and 10 is in the second configuration, and is secured within first and second holes in a first member and an intermediate hole in a second member, the intermediate hole having a slightly larger diameter than the first and second holes.

FIGS. 8-10 show a fixation pin 8 which is in the first configuration and which is made of a nickel titanium alloy. The fixation pin 8 has a constant C-shaped cross-section and is divided by two slits 811 and 812 which are cut part way into the tube 8 at right angles to the axis of the tube, leaving a continuous vertical section 813 of tube 8 which is not penetrated by the slits. The slits divide the fixation pin into an upper portion 821, an intermediate portion 822 and a lower portion 823. When the pin is subjected to a suitable heat treatment in the absence of any restraint, each of the upper, intermediate and lower portions increase in size by the same amount. As shown in FIG. 11, if the tubular fixation pin is inserted through a first hole in a first member 24, an intermediate hole in a second member 25 and a second hole in the first member 4, and the intermediate hole is larger than the first and second holes, the result of a suitable heat treatment is that the intermediate portion 822 increases in size more than the upper and lower portions 821 and 823. The upper and lower portions of the pin are firmly secured to the first member 24, and the central portion of the pin contacts and is a sliding fit within the second member 25. The central portion of the tube is trapped within the connection and prevents accidental removal of the tube. The resistance to rotation of the hinged connection does not change as a result of extended use, because the central portion of the tube automatically increases in size to compensate for wearing of the wall of the intermediate hole.

FIG. 11 shows the pin extending slightly above and below the first member 24, but the upper and lower surfaces of the tube could be flush with, or below, the surface of the first member 24.

Statements.

The following statements define particular combinations of features of the invention.

Statement A1. A hinged connection which comprises
  (A) a first member including (a) a first hole which has a first wall and (b) a second hole which (i) is aligned with and separate from the first hole and (ii) has a second wall,
  (B) a second member including an intermediate hole which (i) is positioned between and aligned with the first and second holes and (ii) has an intermediate wall, and
  (C) a fixation pin which does not have a screw thread on its exterior surface and which comprises (i) a first portion within the first hole, (ii) an intermediate portion within the intermediate hole, and (iii) a second portion within the second hole,
wherein at least a part of the fixation pin contacts
  (i) the first wall and the second wall, and optionally the intermediate wall, or
  (ii) the intermediate wall and optionally the first wall and the second wall.

Statement A2. A hinged connection according to Statement A1 wherein the hinged connection is part of an eyeglass assembly, the first member is the temple member and the second member is the frame member.

Statement A3. A hinged connection according to Statement A1 wherein the hinged connection is part of an eyeglass assembly, the first member is the frame member and the second member is the temple member.

Statement A4. A hinged connection according to any one of Statements A1-A3 wherein each of the first hole, the intermediate hole and the second hole has a circular cross-section.

Statement A5. A hinged connection according to any one of Statements A1-A4 wherein the first hole, the intermediate hole and the second hole have the same cross-section.

Statement A6. A hinged connection according to any one of Statements A1-A4 wherein the first and second holes have the same cross-section, and the intermediate hole has a larger cross-section than the first and second holes.

Statement A7. A hinged connection according to any one of Statements A1-A6 wherein at least part of the first portion of the fixation pin contacts the first wall, at least part of the second portion of the fixation pin contacts the second wall, and at least part of the intermediate portion of the fixation pin contacts the intermediate wall.

Statement A8. A hinged connection according to any one of Statements A1-A6 wherein at least part of the first portion of the fixation pin contacts the first wall, at least part of the second portion of the fixation pin contacts the second wall, and the intermediate portion of the fixation pin does not press the intermediate wall.

Statement A9. A hinged connection according to Statement A7 or Statement A8 wherein the intermediate hole has a larger cross-section than the first and second holes and the intermediate portion of the fixation pin is larger than the first and second portions of the fixation pin.

Statement A10. A hinged connection according to any of Statements A1-A9 wherein the fixation pin is a rod.

Statement A11. A hinged connection according to Statement A10 wherein the rod is straight and cylindrical.

Statement A12. A hinged connection according to Statement A11 wherein the cross-section of the rod is the same throughout its length.

Statement A13. A hinged connection according to Statement A11 wherein the rod has two or more portions of different cross-section along its length.

Statement A14. A hinged connection according to Statement A10 wherein the rod has a solid central portion and two end portions each of which comprises separate components which splay out from the central portion and contact the walls of the first and second holes.

Statement A15. A hinged connection according to Statement A10 wherein the rod comprises a plurality of interlinked curves.

Statement A16. A hinged connection according to any one of Statements A10-A15 wherein the rod is composed of a nickel titanium alloy, for example a nickel titanium alloy such that reducing the temperature of the rod makes it possible to remove the rod from the hinged connection.

Statement A17. A hinged connection according to any one of Statements A10-A15 wherein the rod is composed of a cross-linked polymeric composition.

Statement A18. A hinged connection according to any one of Statements A1-A9 wherein the fixation pin is a tube.

Statement A19. A hinged connection according to Statement A18 wherein the tube is generally cylindrical with an annular cross section.

Statement A20. A hinged connection according to Statement A18 or A19 wherein the tube comprises two or more different longitudinal portions having different cross-sections.

Statement A21. A hinged connection according to Statement A20 wherein the tube has a central portion and two end portions, each of the end portions comprising separate components which splay out from the central portion and contact the first and second walls.

Statement A22. A hinged connection according to Statement A20 wherein the tube has an upper portion, an intermediate portion and a lower portion, each of the portions, being C-shaped, and the portions being joined together by a continuous vertical portion.

Statement A23. A hinged connection according to Statement A22 wherein the upper portion contacts the first wall, the intermediate portion contacts the intermediate wall, and the lower portion contacts the second wall, the diameter of the first and second holes being the same and the diameter of the intermediate hole being greater than the diameter of the first and second holes.

Statement A24. A hinged connection according to Statement A23 wherein the axial heights of the upper, intermediate and lower portions are the same.

Statement A25. A hinged connection according to Statement A23 wherein the axial heights of the upper and lower portions of the tube are the same, and the axial height of the intermediate portion of the tube is different from the axial height of the upper and lower portions.

Statement A26. A hinged connection according to any one of Statements A22-A25 A22 wherein the axial height of the central portion of the tube is 0.8 to 1.6 times, e.g. 1.4-1.5 times, the axial height of each of the upper and lower portions.

Statement A27. A hinged connection according to any one of Statements A22-A26 wherein the C-shaped cross-section extends around 270-320°, e.g. 290-310°, and leaves a gap of 40-90°, e.g. 50-70°, between the ends of the C-shaped cross-section.

Statement A28. A hinged connection according to any one of Statements A22-A27 wherein the vertical section of the tube extends around 50-70°, e.g. about 60°, of the cross-section.

Statement A29. A hinged connection according to any one of Statements A1-A9 wherein the fixation pin is a tube comprising two sets of intersecting slits at angles to each other and at an angle to the axis of the tube.

Statement A30. A hinged connection according to any one of Statements A1-A9 wherein the fixation pin is a tube comprising two sets of overlapping and interconnected strands, the two sets being at angles to each other and at an angle to the axis of the tube.

Statement A31. A hinged connection according to any one of Statements A1-A9 wherein the fixation pin is a tube comprising overlapping longitudinal portions.

Statement A32. A hinged connection according to Statement A31 wherein the overlap is at least 25%, for example 25-100%, of the cross-section of the tube.

Statement A33. A hinged connection according to any one of Statements A18-A32 wherein the tube comprises a nickel titanium alloy, for example a nickel titanium alloy such that reducing the temperature of the tube makes it possible to remove the tube from the hinged connection.

Statement A34. A hinged connection according to any one of Statements A18-A32 wherein the tube comprises a cross-linked polymeric composition.

Statement A35. A hinged connection according to any of Statements A1-A9 wherein the fixation pin is a tube which comprises a sheet of an elastically deformable material which has been rolled-up into overlapping longitudinal portions.

Statement A36. A hinged connection according to Statement A35 wherein the overlap is at least 25%, for example 25-100%, of the cross-section of the tube.

Statement A37. A hinged connection according to Statement A35 or A36 wherein the tube comprises a nickel titanium alloy, for example a nickel titanium alloy such that reducing the temperature of the tube makes it possible to remove the tube from the hinged connection.

Statement A38. A hinged connection according to Statement A35 or A36 wherein the tube comprises a superelastic nickel titanium alloy.

Statement A39. A hinged connection according to Statement A35 or A36 wherein the tube comprises a cross-linked polymeric composition.

Statement A40. A hinged connection according to any one of Statements A1-A39 wherein the fixation pin has a chamfered lip at one or both ends of the pin.

Statement A41. A hinged connection according to any one of Statements A1-A40 wherein the fixation pin has an enlarged head at one end of the pin.

Statement A42. A hinged connection according to any one of Statements A1-A41 wherein one or both ends of the fixation pin comprises means for loosening or withdrawing the fixation pin from the hinged connection, e.g. a thread into which a screw can be screwed or a non-circular, e.g. polygonal, recess into which a tool can be inserted to rotate the fixation pin.

Statement A43. A hinged connection according to any one of Statements A1-A42 wherein the fixation pin has a length of 0.3-2 cm, for example 1.0-1.5 cm, and a diameter of 0.1-0.25 cm, for example 0.2-0.25 cm.

Statement B1. A method of making a hinged connection, the method comprising the steps of
(1) providing
  (A) a first member including (a) a first hole which has a first wall and (b) a second hole which (i) is aligned with and separated from the first hole and (ii) has a second wall, and
  (b) a second member including an intermediate hole which is positioned between and aligned with the first and second holes and which comprises an intermediate wall,
(2) providing a fixation pin which (i) does not have a screw thread on its exterior surface, (ii) is in a first configuration and (iii) has a first end portion, an intermediate portion and a second end portion,
(3) passing the first end portion of the fixation pin through the first hole,
(4) after step (3), passing the first end portion of the fixation pin through the intermediate hole, while simultaneously passing the central portion of the fixation pin through the first hole,
(5) after step (4), passing the first end portion of the fixation pin into the second hole, while simultaneously passing the second end portion of the fixation pin into the first hole and passing the central portion of the fixation pin into the intermediate hole, and
(6) after step (5), subjecting the fixation pin to a treatment which expands at least part of the fixation pin,
whereby at least a part of the fixation pin
  (i) contacts the first wall and the second wall, and optionally contacts the intermediate wall, or
  (ii) contacts the intermediate wall and optionally contacts the first wall and the second wall.

Statement B2. A method according to Statement B1 wherein the hinged connection is part of an eyeglass assembly, the first member is the temple member and the second member is the frame member.

Statement B3. A method according to Statement B1 wherein the hinged connection is part of an eyeglass assembly, the first member is the frame member and the second member is the temple member.

Statement B4. A method according to any one of Statements B1-B3 wherein each of the first hole, the intermediate hole and the second hole has a circular cross-section.

Statement B5. A method according to any one of Statements B1-B4 wherein the first hole, the intermediate hole and the second hole have the same cross-section.

Statement B6. A method according to any one of Statements B1-B4 wherein the first and second holes have the same cross-section, and the intermediate hole has a larger cross-section than the first and second holes.

Statement B7. A method according to any one of Statements B1-B6 wherein, after the treatment in step (6), at least part of the first portion of the fixation pin contacts the first wall, at least part of the second portion of the fixation pin contacts the second wall, and at least part of the intermediate portion of the fixation pin contacts the intermediate wall.

Statement B8. A method according to any one of Statements B1-B6 wherein, after the treatment in step (6), at least part of the first portion of the fixation pin contacts the first wall, at least part of the second portion of the fixation pin contacts the second wall, and the intermediate portion of the fixation pin does not press the intermediate wall.

Statement B9. A method according to Statement B7 or Statement B8 wherein the intermediate hole has a larger cross-section than the first and second holes and, after the treatment in step (6), the intermediate portion of the fixation pin is larger than the first and second portions of the fixation pin.

Statement B10. A method according to any of Statements B1-B9 wherein the fixation pin is a rod.

Statement B11. A method according to Statement B10 wherein the fixation pin, before step (6), is a solid, straight and cylindrical rod.

Statement B12. A method according to Statement B11 or B12 wherein the cross-section of the rod, before step (6), is the same throughout its length.

Statement B13. A method according to Statement B11 wherein the rod, after step (6), has two or more portions of different cross-section along its length.

Statement B14. A method according to Statement B10 wherein the rod, before step (6), has a solid central portion and two end portions each of which comprises at least one slit, and after step (6) each of the end portions comprises separate components which splay out from the central portion and contact the first and second walls.

Statement B15. A method according to Statement B10 wherein the rod, before step (6), comprises a plurality of interlinked curves.

Statement B16. A method according to any one of Statements B10- B15 wherein the rod (i) is composed of a nickel titanium alloy, (ii) is at a first temperature during steps (1) to (5), and (iii) in step (6) is heated to a higher temperature.

Statement B17. A method according to any one of Statements B10- B15 wherein the rod is composed of a cross-linked polymeric composition, and the treatment in step (6) includes heating the fixation pin.

Statement B18. A method according to any one of Statements B1-B9 wherein the fixation pin is a tube.

Statement B19. A method according to Statement B18 wherein the tube is generally cylindrical with an annular cross section.

Statement B20. A method according to Statement B18 or B19 wherein, after step (6), the tube comprises two or more different longitudinal portions having different cross-sections.

Statement B21. A method according to Statement B20 wherein the tube, before step (6), has a central portion and two end portions each of which comprises at least one slit, and after step (6), each of the end portions comprises separate components which splay out from the central portion and contact the first and second walls.

Statement B22. A method according to Statement B20 wherein the tube has an upper portion, an intermediate portion and a lower portion, each of the portions being C-shaped, and the portions being joined together by a continuous vertical section.

Statement B23. A method according to Statement B22 wherein, after step (6), the upper portion contacts the first wall, the intermediate portion contacts the intermediate wall, and the lower portion contacts the second wall, the diameter of the first and second holes being the same and the diameter of the intermediate hole being greater than the diameter of the first and second holes.

Statement B24. A method according to Statement B23 wherein the axial heights of the upper, intermediate and lower portions are the same.

Statement B25. A method according to Statement B23 wherein the axial heights of the upper and lower portions of the tube are the same, and the axial height of the intermediate portion of the tube is different from the axial height of the upper and lower portions.

Statement B26. A method according to any one of Statements B22-B25 wherein the axial height of the central portion of the tube is 0.8 to 1.6 times, e.g. 1.4-1.5 times, the axial height of each of the upper and lower portions.

Statement B27. A method according to any one of Statements B22-B26 wherein the C-shaped cross-section extends around 270-320°, e.g. 290-310°, and leaves gap of 40-90°, e.g. 50-70°, between the ends of the C-shaped cross-section.

Statement B28. A method according to any one of Statements B22-B27 wherein the vertical section of the tube extends around 50-70°, e.g. about 60°, of the cross-section.

Statement B29. A method according to any one of Statements B1-B9 wherein the fixation pin is a tube having two sets of intersecting slits at angles to each other and at an angle to the axis of the tube.

Statement B30. A method according to any one of Statements B1-B9 wherein the fixation pin is a tube comprises two sets of overlapping and interconnected strands, the two sets being at angles to each other and at an angle to the axis of the tube.

Statement B31. A method according to any one of Statements B1-B9 wherein the fixation pin is a tube comprising overlapping longitudinal portions.

Statement B32. A method according to Statement B31 wherein the overlap is at least 25%, for example 25-100%, of the cross-section of the tube.

Statement B33. A method according to any one of Statements B18- B32 wherein the tube (i) is composed of a nickel titanium alloy, (ii) is at a first temperature during steps (1) to (5), and (iii) in step (6) is heated to a higher temperature.

Statement B34. A method according to any one of Statements B18-B32 wherein the tube comprises a cross-linked polymeric composition and the treatment in step (6) includes heating the fixation pin.

Statement B35. A method according to any of Statements B1-B9 wherein the fixation pin is a tube which comprises a sheet of an elastically deformable material which has been rolled-up into overlapping longitudinal portions and which partially unrolls during step (6).

Statement B36. A method according to Statement B35 wherein the overlap is at least 25%, for example 25-100%, of the cross-section of the tube.

Statement B37. A method according to Statement B35 or B36 wherein the tube (i) comprises a nickel titanium alloy, (ii) is at a first temperature during steps (1) to (5), and (iii) in step (6) is heated to a higher temperature.

Statement B38. A method according to Statement B35 or B36 wherein the tube comprises a superelastic nickel titanium alloy.

Statement B39. A method according to Statement B35 or AB6 wherein the tube comprises a cross-linked polymeric composition and the treatment in step (6) includes heating the fixation pin.

Statement B40. A method according to any one of Statements B1-B39 wherein the fixation pin has a length of 0.3-2 cm, for example 1.0-1.5 cm and a diameter of 0.1-0.25 cm, for example about 0.2-0.25 cm.

Statement C1. A method of making a hinged connection, the method comprising the steps of
(1) providing
  (A) a first member including (a) a first hole which has a first wall and b) a second hole which (i) is aligned with and separated from the first hole and (ii) has a second wall, and
  (b) a second member including an intermediate hole which is positioned between and aligned with the first and second holes and which comprises an intermediate wall,
(2) providing a fixation pin which (i) does not have a screw thread on its exterior surface, (ii) is in a first configuration and (iii) has a first end portion, an intermediate portion and a second end portion,
(3) passing the first end portion of the fixation pin through the first hole,
(4) after step (3), passing the first end portion of the fixation pin through the intermediate hole, while simultaneously passing the central portion of the fixation pin through the first hole, and
(5) after step (4), passing the first end portion of the fixation pin into the second hole, while simultaneously passing the second end portion of the fixation pin into the first hole and passing the central portion of the fixation pin into the intermediate hole;
wherein the fixation pin expands spontaneously while it is being passed through the first, intermediate and second holes or immediately thereafter, so that at least a part of the fixation pin
  (i) contacts the first wall and the second wall, and optionally contacts the intermediate wall, or
  (ii) contacts the intermediate wall and optionally contacts the first wall and the second wall.

Statement C2. A method according to Statement C1 wherein the hinged connection is part of an eyeglass assembly, the first member is the temple member and the second member is the frame member.

Statement C3. A method according to Statement C1 wherein the hinged connection is part of an eyeglass assembly, the first member is the frame member and the second member is the temple member.

Statement C4. A method according to any one of Statements C1-C3 wherein each of the first hole, the intermediate hole and the second hole has a circular cross-section.

Statement C5. A method according to any one of Statements C1-C4 wherein the first hole, the intermediate hole and the second hole have the same cross-section.

Statement C6. A method according to any one of Statements C1-C4 wherein the first and second holes have the same cross-section, and the intermediate hole has a larger cross-section than the first and second holes.

Statement C7. A method according to any one of Statements C1-C6 wherein, as a result of the spontaneous recovery of the fixation pin, at least part of the fixation pin contacts the first wall, at least part of the fixation pin contacts the second wall, and at least part of the fixation pin contacts the intermediate wall.

Statement C8. A method according to any one of Statements C1-C6 wherein , as a result of the spontaneous recovery of the fixation pin, part of the fixation pin contacts the first wall, part of the fixation pin contacts the second wall, and none of the fixation pin contacts the intermediate wall.

Statement C9. A method according to Statement C7 or Statement C8 wherein the intermediate hole has a larger cross-section than the first and second holes.

Statement C10. A method according to any of Statements C1-C9 wherein the fixation pin is a rod.

Statement C11. A method according to Statement C10 wherein the fixation pin, before step (3), is a solid, straight and cylindrical rod.

Statement C12. A method according to Statement C11 wherein the cross-section of the rod, before step (3), is the same throughout its length.

Statement C13. A method according to Statement C11 wherein the rod, before step (3), has two or more portions of different cross-section along its length.

Statement C14. A method according to Statement C10 wherein the rod, before step (3), comprises a plurality of interlinked curves.

Statement C15. A method according to Statement C14 wherein the rod comprises a superelastic nickel titanium alloy.

Statement C16. A method according to any one of Statements C1-C9 wherein the fixation pin is a tube.

Statement C17. A method according to Statement C16 wherein the tube is generally cylindrical with an annular cross section.

Statement C18 A method according to Statement C16 or C17 wherein, as a result of its spontaneous recovery, the fixation pin comprises two or more different longitudinal portions having different cross-sections.

Statement C19. A method according to any one of Statements C1-C9 wherein the fixation pin is a tube having two sets of intersecting slits at angles to each other and at an angle to the axis of the tube.

Statement C20. A method according to any one of Statements C1-C9 wherein the fixation pin is a tube comprises two sets of overlapping and interconnected strands, the two sets being at angles to each other and at an angle to the axis of the tube.

Statement C21. A method according to any one of Statements C1-C9 wherein the fixation pin is a tube comprising overlapping longitudinal portions.

Statement C22. A method according to Statement C21 wherein the overlap, before step ((3), is at least 25%, for example 25-100%, of the cross-section of the tube.

Statement C23. A method according to any one of Statements C16-C22 wherein the tube comprises a nickel titanium alloy.

Statement C24. A method according to any one of Statements C16-C22 wherein the tube comprises a superelastic nickel titanium alloy.

Statement C25. A method according to any one of Statements C16-C22 wherein the tube comprises a cross-linked polymeric composition.

Statement C26. A method according to any of Statements C1-C9 wherein the fixation pin is a tube which comprises a sheet of an elastically deformable material which has been rolled-up into overlapping longitudinal portions and which partially unrolls spontaneously while it is being passed through the first, intermediate and second holes or immediately thereafter.

Statement C27. A method according to Statement C26 wherein, before step (3, the overlap is at least 25%, for example 25-100%, of the cross-section of the tube.

Statement C28. A method according to Statement C26 or C27 wherein the tube comprises a nickel titanium alloy.

Statement C29. A method according to Statement C26 or C27 wherein the tube comprises a superelastic nickel titanium alloy.

Statement C30. A method according to Statement C26 or C27 wherein the tube comprises a cross-linked polymeric composition.

Statement C40. A method according to any one of Statements C1-C30 wherein the fixation pin has a length of 0.3-2 cm, for example 1.0-1.5 cm and a diameter of 0.1-0.25 cm, for example about 0.2-0.25 cm.

Statement D1. A method of making a hinged connection, the method comprising the steps of
(A) providing
  (a) a first member including (i) a first hole which comprises a first wall and (ii) a second hole which is aligned with and separated from the first hole and which comprises a second wall, and
  (b) a second member including an intermediate hole which is positioned between and aligned with the first and second holes and which comprises an intermediate wall,
(B) providing a fixation pin which (i) does not have a screw thread on its exterior surface, and (ii) has a first end portion, an intermediate portion and a second end portion,
(C) passing the first end portion of the fixation pin through the first hole,
(D) after step (C), passing the first end portion of the fixation pin through the intermediate hole, while simultaneously passing the central portion of the fixation pin through the first hole,
(E) after step (D), passing the first end portion of the fixation pin into the second hole and beyond the second hole to provide an extending lower portion, while simultaneously passing the second end portion of the fixation pin into the first hole and passing the central portion of the fixation pin into the intermediate hole, and
(F) after step (E) securing a Belleville washer to the extending lower portion of the fixation pin.

Statement D1. A method of disassembling a hinged connection as defined in any one of Statements A1-A43, or a hinged connection prepared by a method as defined in any one of Statements B1-B40, or a hinged connection prepared by method as defined in any one of Statements C1-C40, the method comprising subjecting the hinged connection to conditions which change the second configuration of the fixation pin into a new configuration which reduces the strength of the connection between the fixation pin and the first, intermediate and second holes, for example a new configuration which enables the fixation pin to be removed with little or no force.

Statement D2. A method according to Statement D1 wherein the fixation pin comprises a nickel titanium alloy and the conditions which change the second configuration of the fixation pin comprise reducing the temperature of the hinged connection.

Statement E1. A method of disassembling a hinged connection as defined in any one of Statements A1-A43, or a hinged connection prepared by a method as defined in any one of Statements B1-B40, or a hinged connection prepared by method as defined in any one of Statements C1-C40, the method comprising subjecting an end of the fixation pin to a driving force which drives the fixation pin out of the hinged connection without making any change in the configuration of the fixation pin except changes which result from the driving force itself.

Statement F1. An elongate article which can be divided by cross cutting into a plurality of fixation pins suitable for use in a hinged connection as defined in any one of Statements A1-A43, or a hinged connection prepared by a method as defined in any one of Statements B1-B40, or a hinged connection prepared by a method as defined in any one of Statements C1-C40.

Statement E1. A kit of parts which comprises a plurality of fixation pins suitable for use in a hinged connection as defined in any one of Statements A1-A43, or a hinged connection prepared by a method as defined in any one of Statements B1-B40, or a hinged connection prepared by a method as defined in any one of Statements C1-C40, the fixation pins differing in one or more of the length, diameter and cross-section.

Statement F1. A frame member including a first hole having a first wall and a second hole having a second wall, the first and second holes being aligned and separated from each other and neither of the first wall and the second wall having a screw thread.

Statement G1. A temple member including a first hole having a first wall and a second hole having a second wall, the first and second holes being aligned and separated from each other and neither of the first wall and the second wall having a screw thread.

Statement H1. A kit of parts for a hinged connection, preferably a hinged connection which is part of an eyeglass assembly, the kit of parts comprising (1) a first member including a first hole having a first wall and a second hole having a second wall, neither of the first and second walls having a screw thread, the first and second holes being aligned and separated from each other, and (2) a second member including an intermediate hole which (i) has an intermediate wall which does not have a screw thread and (ii) is fitted, or can be fitted, between the first and second holes of the first member, one of the first member and the second member being a frame member and the other being a temple member.

Statement H2. A kit of parts according to Statement H1 wherein
(A) the intermediate hole is slightly larger than the first and second holes, or
(B) the first and second holes are slightly larger than the intermediate hole, or
(C) the first, intermediate and second holes are of the same size.

The invention claimed is:

1. A hinged connection which comprises
   (A) a first member including (a) a first hole which has a first wall and (b) a second hole which (i) is aligned with and separated from the first hole and (ii) has a second wall,
   (B) a second member including an intermediate hole which (i) is positioned between and aligned with the first and second holes and (ii) has an intermediate wall, and
   (C) a fixation pin which does not have a screw thread on its exterior surface and which comprises (i) a first portion within the first hole, (ii) an intermediate portion within the intermediate hole, and (iii) a second portion within the second hole,
   wherein the fixation pin has a central portion of constant cross-section and two end portions each of which comprises separate components which splay out from the central portion and contact the walls of the first and second holes.

2. A hinged connection according to claim 1 wherein the upper portion and the lower portion are C-shaped and are joined together by a continuous central section.

3. A method of making a hinged connection according to claim 1, the method comprising the steps of
   (1) providing the first member and the second member as defined in claim 1,
   (2) providing a fixation pin as defined in claim 1 comprising a first end portion in which the separate components are not splayed outwards and a second end portion in which the separate components are not splayed outwards
   (3) passing the first end portion of the fixation pin through the first hole,
   (4) after step (3), passing the first end portion of the fixation pin through the intermediate hole, while simultaneously passing the central portion of the fixation pin through the first hole,
   (5) after step (4) passing the first end portion of the fixation pin into the second hole, while simultaneously passing the second end portion of the fixation pin into the first hole and passing the central portion of the fixation pin into the intermediate hole, and
   (6) after step (5), subjecting the fixation pin to a treatment which expands the first and second end portions so that components thereof splay out and contact the walls of the first and second holes.

4. A method of disassembling a hinged connection as defined in claim 1, the method comprising subjecting the hinged connection to conditions which change the configuration of the fixation pin into a new configuration which reduces the strength of the connection between the end portions of the fixation pin and the first and second holes.

5. A method according to claim 4 wherein the fixation pin comprises a nickel titanium alloy and the temperature of the hinged connection is reduced to reduce the strength of the connection between the end portions of the fixation pin and the first and second holes.

6. A hinged connection according to claim 1 wherein the fixation pin is composed of a nickel titanium alloy.

7. A hinged connection according to claim 6 wherein the central portion of the fixation pin has a circular cross-section and each of the two end portions has a C-shaped cross-section.

8. A hinged connection according to claim 1 wherein the first member is a temple member of an eyeglass assembly and the second member is a frame member of an eyeglass assembly.

9. A hinged connection according to claim 1 wherein the first member is a frame member of an eyeglass assembly and the second member is a temple member of an eyeglass assembly.

* * * * *